Feb. 15, 1927.
R. P. HAFNER
1,618,082
ATTACHMENT FOR SHEARS
Filed July 16, 1926
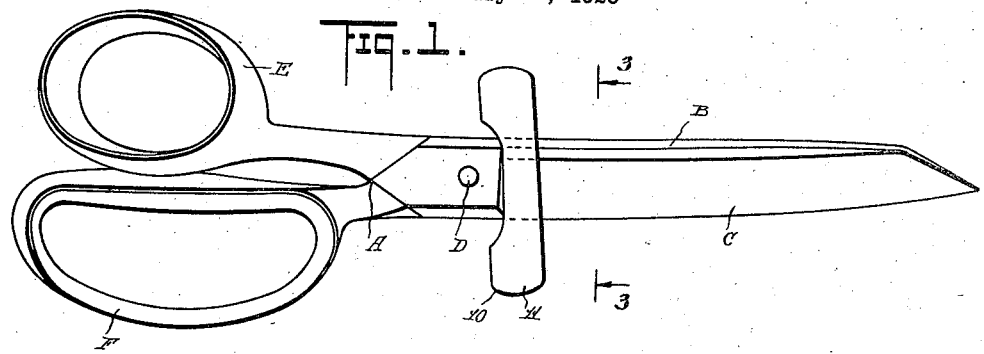
INVENTOR
Richard P. Hafner
BY
ATTORNEYS Patented Feb. 15, 1927.

1,618,082

UNITED STATES PATENT OFFICE.

RICHARD PAUL HAFNER, OF PASSAIC, NEW JERSEY.

ATTACHMENT FOR SHEARS.

Application filed July 16, 1926. Serial No. 122,931.

This invention relates to and comprehends an attachment for shears, scissors, or other cutting implements of this nature to afford means for insuring the proper coaction of the shearing edges of the blades.

One of the principal objects and advantages of the present invention is to provide an attachment for shears, scissors, or other cutting implements of this nature, which when applied, positively insures the proper correlation of the shearing or cutting edges irrespective of whether the same are manipulated with the right or the left hand.

The invention furthermore aims to provide an attachment of this character which is extremely simple in its construction, inexpensive to manufacture, and which is readily applicable to or removable from an implement.

With the above recited and other objects in view, reference is had to the following specification and accompanying drawings in which there is exhibited certain examples or embodiments of the invention which are in no way intended as limitations upon the scope of the appended claims as it is to be clearly understood that variations and modifications which properly fall within the scope of said claims may be resorted to when found expedient.

In the drawings—

Figure 1 is a side view of an implement with the attachment applied;

Fig. 2 is a similar fragmentary view illustrating the blades of the implement open;

Fig. 3 is a sectional view taken approximately on the line 3—3 of Fig. 1;

Fig. 4 is a fragmentary edge view of the implement with the attachment applied;

Fig. 5 is a perspective view of an implement with a slightly modified form of the attachment in applied position;

Fig. 6 is a similar view of a further modification.

Referring to the drawings by characters of reference, A indicates generally a pair of shears or scissors including blades B and C which are pivotally connected at D and provided with handles E and F.

The attachment constituting the present invention consists of a strip of resilient material, which is cut, bent and formed to provide a body 10 of substantially U-shape in cross sectional configuration presenting arms 11 connected by a bight 12. The free edges 13 of the arms are preferably bowed oppositely to present the concave portions toward each other, while the bight or connecting portion 12 is medially slotted at 14.

In practice, the attachment is preferably applied with the bight portion disposed toward the handles E and F, with the blades B and C inserted through the slot 14, as illustrated. Under this arrangement, the edges 13 exert a pressure against the blades to cause the shearing or cutting edges G to properly coact with each other. By this action, it is obvious that the necessity of exerting lateral pressure on the handles to cause the shearing edges G to properly coact, is obviated, and hence proper manipulation of the shears with either hand may be accomplished without practice on the part of the user.

In the modified form of the invention illustrated in Fig. 5, one of the arms 11$^a$ of the body 10$^a$, is formed at its opposite extremities with outwardly projecting extensions 12$^a$ having laterally bent terminals 13$^a$ to serve as a means for supporting the implement in slightly elevated relation to a supporting surface, thereby facilitating the removal of the same therefrom.

In the modified form illustrated in Fig. 6, the extensions 12$^b$ and angularly-projecting extremities 13$^b$ are formed at the opposite extremities of opposite arms 11$^b$.

What is claimed is:

1. An attachment for shears, scissors, and other similar shearing implements, comprising means engaging over and exerting an inward pressure on the blades for causing proper coaction of the cutting edges, said means consisting of a strip of resilient material cut, bent and formed to provide a body of cross-sectional U-shaped configuration, including side arms joined by a bight having a medial slot through which the blades extend.

2. An attachment for shears, scissors, and other similar shearing implements, comprising means engaging over and exerting an inward pressure on the blades for causing proper coaction of the cutting edges, said means consisting of a strip of resilient material cut, bent and formed to provide a body of cross-sectional U-shaped configuration, including side arms joined by a bight having a medial slot through which the blades extend, the free edges of the side arms being bowed longitudinally with the concave sides disposed toward each other.

3. An attachment for shears, scissors, and other similar shearing implements, comprising means engaging over and exerting an inward pressure on the blades for causing proper coaction of the cutting edges, said means consisting of a strip of resilient material cut, bent and formed to provide a body of cross-sectional U-shaped configuration, including side arms joined by a bight having a medial slot through which the blades extend, the free edges of the side arms being bowed longitudinally with the concave sides disposed toward each other, and means formed at the side extremities of said arms for disposing the implement above the level of a supporting surface to facilitate grasping and removal of the same.

4. An attachment for shears, scissors, and other similar shearing implements, comprising means engaging over and exerting an inward pressure on the blades for causing proper coaction of the cutting edges, said means consisting of a strip of resilient material cut, bent and formed to provide a body of cross-sectional U-shaped configuration, including side arms joined by a bight having a medial slot through which the blades extend, the free edges of the side arms being bowed longitudinally with the concave sides disposed toward each other, and means formed at the side extremities of said arms for disposing the implement above the level of a supporting surface to facilitate grasping and removal of the same, said means consisting of extensions bent at an angle to the plane of the body.

RICHARD PAUL HAFNER.